United States Patent [19]
Kuo

[11] Patent Number: 5,922,474
[45] Date of Patent: Jul. 13, 1999

[54] SOLVENTLESS COATINGS BASED ON LOW-VISCOSITY POLYESTERS

[75] Inventor: Thauming Kuo, Kingsport, Tenn.

[73] Assignee: Eastman Chemical Company, Kingsport, Tenn.

[21] Appl. No.: 09/010,719

[22] Filed: Jan. 22, 1998

[51] Int. Cl.⁶ ............................ B32B 27/10; C08G 63/48
[52] U.S. Cl. ................... 428/481; 528/295.5; 528/300; 528/301; 528/302; 528/303; 528/306; 528/307; 528/308; 528/308.6; 525/437; 525/440; 525/441; 525/443; 525/444.5; 525/447; 525/448; 525/539; 524/81; 524/800; 428/480; 501/14
[58] Field of Search ..................... 528/295.5, 300, 528/301, 302, 303, 306, 307, 308, 308.6; 525/437, 440, 441, 443, 444.5, 447, 448, 539; 524/81, 800; 428/480, 481; 501/14

[56] References Cited

U.S. PATENT DOCUMENTS 3,994,851  11/1976  Chang .
4,222,911   9/1980  Christenson et al. ................. 528/295.5
4,251,406   2/1981  Heiberger ................................. 106/253

FOREIGN PATENT DOCUMENTS

WO 95/19997  7/1995  WIPO .

*Primary Examiner*—Samuel A. Acquah
*Attorney, Agent, or Firm*—Rose M. Allen; Bernard J. Graves; Harry J. Gwinnell

[57] ABSTRACT

The present invention relates to polyesters formed by reacting components comprising: (a) from about 20 to about 45 mol% of a diol; (b) from about 4 to about 25 mol% of a polyol; (c) from about 5 to about 25 mol% of a diacid; (d) up to 6 mol% of an ethylenically unsaturated anhydride; and (e) from about 35 to about 45 mol% of a monofunctional fatty acid, where all mole percentages are based on the total mols of (a), (b), (c), (d) and (e). Further, the present invention is directed to liquid enamel compositions comprising: (1) from about 50 to about 90 wt. % of a polyester of the present invention; (2) about 10 to about 50 wt. % of a crosslinking agent; and (3) less than about 20 wt. % of a suitable organic solvent; where all weight percentages are based on the total weight of (1), (2) and (3). The liquid enamel compositions of the present invention have a viscosity of 50 to 1,000 mPa s (cP) at room temperature.

17 Claims, No Drawings

SOLVENTLESS COATINGS BASED ON LOW-VISCOSITY POLYESTERS

BACKGROUND OF THE INVENTION

The present invention relates to liquid enamel compositions formed without using solvent. The liquid enamel compositions comprise polyester resins having low viscosity. The liquid enamel compositions of the present invention find utility as solventless coatings or extra high-solids coatings having significantly reduced volatile organic compounds (VOC) content.

A primary component of a coating composition is the film forming component which provides for protection of the substrate and optionally provides a decorative coating. Film formation is the conversion of a coatings composition in a container into an adherent, durable coating. For almost all methods of application, an ideal coating is one that is free flowing during application at the fluidity best suited for the particular method of application but, which once applied to a surface, spreads out into a uniform film, loses its ability to flow and thus forms a film that is smooth and of uniform thickness. This has been achieved in the past by proper selection of a solvent that imparts good viscosity and flow during application of the coating and proper evaporation rate to permit rapid build up of film viscosity, but not so rapid as to result in an undesirably uneven surface. An additional important consideration concerning a coating is the film clarity. Film clarity is particularly important for decorative coatings and in top coat applications.

As a result of environmental concerns and governmental regulations, in particular on the state level, intense research efforts have been made in the coatings industry to reduce the emission of volatile organic compounds (VOC). High-solids coatings, waterborne coatings, powder coatings and radiation-cure coatings are the emerging technologies developed in the industry to meet this need. Among the above technologies, high-solids coatings have been widely accepted since they do not require the conversion of existing conventional manufacturing facilities for implementation of the new technology.

High-solids coatings typically contain 50–70 wt. % of solid resins in suitable organic solvents. Coatings with higher than 70 wt. % solids are more difficult to obtain due to the increasingly high viscosity of the formulation. Efforts are, therefore, being directed to synthesizing resins with reduced viscosity. One way to achieve reduced viscosity is to reduce the molecular weight of the coatings vehicle, normally a polyester resin. However, as the molecular weight of the polyester resin decreases, the resin is more likely to crystallize or form a hazy resin, thus making the resin unsuitable for use in liquid coatings applications. This is especially true if the polyester has a linear structure. It has therefore become a challenge to attempt to design and synthesize a resin suitable for solventless or extra high-solids coatings applications while maintaining good quality and clarity of the formulation. The term "extra high-solids" is used herein to denote less than 20 wt % solvent in the formulation.

U.S. Pat. No. 3,994,851 describes a coating composition formulated from an ester-containing polyol having a molecular weight of less than about 850 and a viscosity of less than about 60 poises, and an amine-aldehyde crosslinking agent. The ester-containing polyol comprises an aliphatic non-alicyclic acid and a polyol. However, the patent does not teach the use of a combination of a polyol and a long-chain monofunctional fatty acid as a component of the polyester resin.

PCT International Application WO 95/19997 discloses a solventless coating composition based on a linear oligoester diol having a number average molecular weight in the range of from 275 to about 1,200. The linear oligoester diol of the patent is described as the reaction product of a linear dicarboxylic acid or ester and a linear diol. Thus, the above compositions have the disadvantage of the linear structured oligomeric esters described above.

Therefore, a need exists for liquid coating formulations without solvent or having extra high-solids content, without the disadvantages of having a low molecular weight, linear polyester vehicle. There is also a need for polyester resins which exhibit low viscosity.

SUMMARY OF THE INVENTION

An object of the present invention is to provide liquid enamel compositions with reduced solvent content and having extra high-solids content. In order to obtain such compositions, Applicants have discovered novel polyesters useful in liquid enamel compositions. The novel polyesters of the present invention are formed by reacting monomeric components comprising (a) from about 20 to about 45 mol% of a diol; (b) from about 4 to about 25 mol% of a polyol; (c) from about 5 to about 25 mol% of a diacid; (d) up to 6 mol% of an unsaturated anhydride; and (e) from about 35 to about 45 mol% of a monofunctional fatty acid. All mole percentages are based on the total mols of (a), (b), (c), (d) and (e).

As a further aspect of the present invention there is provided liquid enamel compositions comprising (1) from about 50 to about 90 wt. % of polyesters of the present invention; (2) about 10 to about 50 wt. % of crosslinking agent; and (3) less than about 20 wt. % of organic solvents. All weight percentages are based on the total weight of components (1), (2) and (3). The liquid enamel compositions of the present invention have a viscosity of 50 to 1,000 mPa s (cP) at room temperature.

DESCRIPTION OF THE PREFERRED EMBODIMENT

Liquid enamel compositions of the present invention may be prepared with reduced solvent levels using polyester resins of the present invention which exhibit low viscosity. It has been discovered that polyester resins exhibiting low viscosity may be prepared by using a polyol and a long-chain monofunctional fatty acid. These polyester resins are hydroxyl functionalized and may be formulated directly into liquid enamel compositions with an added crosslinker for thermosetting coating applications. The polyester resins have utility for solventless or extra high-solids coatings with reduced volatile organic compounds (VOCs).

Applicants have discovered a novel polyester formed by reacting monomeric components (a), (b), (c), (d) and (e) as described above and explained in detail below. Further, the present invention provides liquid enamel compositions comprising components (1), (2) and (3) as described above and explained in detail below.

(1) Polyester

Polyesters useful in the practice of the present invention are non-linear polyesters formed by the reaction of the following components:

Component (a): at least one diol

Suitable diols used in forming polyesters of the present invention include, but are not limited to, $C_1$–$C_{20}$-aliphatic, $C_1$–$C_{20}$-alicyclic and $C_1$–$C_{20}$-aralkyl glycols. The term "aliphatic" is used to denote a compound with no aromatic ring; the term "alicyclic" is used to denote an aliphatic compound containing at least one non-aromatic ring; the term "aralkyl" is used to denote an alkyl compound containing an aryl group; further, the terms "alkyl" and "aryl" are used as defined in the scientific literature. Examples of these glycols include, ethylene glycol; propylene glycol; 1,3-propane diol; 2,4-dimethyl-2-ethylhexane-1,3-diol; 2,2-dimethyl-1,3-propanediol (neopentyl glycol); 2-ethyl-2-butyl-1,3-propane diol; 2-ethyl-2-isobutyl-1,3-propane diol; 1,3-butane diol, 1,4-butanediol; 1,5-pentanediol, 1,6-hexanediol; 2,2,4-trimethyl-1,6-hexanediol; thioldiethanol; 1,2-cyclohexane dimethanol; 1,3-cyclohexane dimethanol; 1,4-cyclohexane dimethanol; 2,2,4,4-tetra-methyl-1,3-cyclobutane diol; p-xylylenediol; diethylene glycol; triethylene glycol; tetraethylene glycol; pentaethylene glycol; hexaethylene glycol; heptaethylene glycol; octaethylene glycol; monoethylene glycol; decaethylene glycol; 2,2,4-trimethyl-1,3-pentanediol; 2,2,4-trimethyl-1,3-cyclobutanediol; p-xylenediol; hydroxypivalyl hydroxypivalate; 1,10-decanediol and hydrogenated bisphenol A.

The amount of component (a) may range from about 20 to about 45 mol%. A preferred amount of component (a) is from about 25 to about 40 mol%; and a more preferred amount for component (a) is from about 30 to about 35 mol%.

Component (b): a polyol

The term "polyol" is used to denote a compound containing more than two hydroxyl groups. Suitable polyols used in forming polyesters of the present invention include, but are not limited to, trimethylolpropane; trimethylolethane; pentaerythritol; erythritol; threitol; dipentacrythritol; sorbitol and glycerine.

The amount of component (b) may range from about 4 to about 25 mol%. A preferred amount of component (b) is from about 6 to about 20 mol%; and a more preferred amount for component (b) is from about 8 to about 15 mol%.

Component (c): at least one dicarboxylic acid

Suitable dicarboxylic acids used in forming polyesters of the present invention include, but are not limited to, aliphatic dicarboxylic acids, alicyclic dicarboxylic acids, aromatic dicarboxylic acids, or mixtures of two or more of these acids. It should be understood that the term "dicarboxylic acid" does not encompass ethylenically unsaturated anhydrides, subject matter of component (d) below. Examples of useful dicarboxylic acids, include terephthalic acid; tetrachlorophthalic anhydride; isophthalic acid; phthalic acid; phthalic anhydride; dodecanedioic acid; azelaic acid; 1,3-cyclohexanedicarboxylic acid; succinic acid; glutaric acid; adipic acid; sebacic acid; and 1,4-cyclohexane dicarboxylic acid.

It should be understood that use of the corresponding esters, acid chlorides, and acid anhydrides (other than ethylenically unsaturated anhydrides) of these acids is included in the term "dicarboxylic acid".

The amount of component (c) may range from about 5 to about 25 mol%. A preferred amount of component (c) is from about 10 to about 20 mol%; and a more preferred amount is from about 13 to about 18 mol%.

Component (d): an ethylenically unsaturated anhydride

It should be understood that the term "ethylenically unsaturated anhydride" denotes an ethylenically unsaturated acid anhydride as well as an ethylenically unsaturated diacid that can be converted to an acid anhydride.

Suitable ethylenically unsaturated anhydrides used in forming polyesters of the present invention include, but are not limited to, maleic anhydride, maleic acid, itaconic anhydride, fumaric acid, itaconic acid, tetrahydrophthalic anhydride, crotonic acid and crotonic anhydride.

The amount of compound (d) may range from about 0 to about 6 mol%. A preferred amount of component (d) is from about 2 to about 5 mol%; and a more preferred is from about 3 to about 4 mol%.

Component (e): a monofunctional fatty acid

Suitable monofunctional fatty acids used in forming polyesters of the present invention include, but are not limited to, tallow acid; linoleic acid; linolenic acid; oleic acid; soya acid; myristic acid; linseed acid; crotonic acid; versatic acid; coconut acid; tall oil fatty acid; rosin acid; neodecanoic acid; isostearic acid; 12-hydroxystearic; and cottonseed acid.

The amount of component (e) may range from about 30 to about 45 mol%. A preferred amount of component (e) is from about 30 to about 50 mol%; and a more preferred amount is from about 35 to about 45 mol%.

All mol percentages for the above components are based on the total mols of components (a), (b), (c), (d), and (e) present in the polyester.

A typical process for preparation of polyesters useful in the practice of the present invention may involve a two-stage process. In the first stage, components (a), (b), (c), and (d), are admixed in the presence of an acid catalyst, such as FASCAT 4100 catalyst (available from Atochem), and reacted under a nitrogen atmosphere at 160° C. to 200° C. until about 90 to 100 percent of the calculated theoretical amount of the condensate (water) is collected in a Dean-Stark trap. The theoretical amount of condensate is calculated according to the equivalents of diacids used, as is commonly known in the art. The reaction mixture is then cooled. In the second stage of the reaction, component (e) is added to the cooled mixture and the reaction is allowed to continue at 180° C. to 220° C. until an acid number of about 0 to about 15 mg KOH/g is obtained according to ASTM Method D1639.

In an alternate process, a one-stage process may be used. When using a one-stage process, components (a), (b), (c), (d), (e) and a catalyst are all charged to a reactor and allowed to react at 160° C. to 220° C. until an acid number of about 0 to about 15 mg KOH/g is obtained according to ASTM Method D1639.

Preferred polyesters for the practice of the invention are hydroxyl functionalized polyesters having a hydroxyl number of about 50 to about 120, an acid number of about 0 to about 5 mg KOH/g, and a number average molecular weight (Mn) of about 700 to about 1800. The polyesters of the present invention are preferably formulated to provide liquid resins having Brookfield viscosities, as measured by a Brookfield Viscometer, of from about 50 to about 1,000 mPa-s; more preferably from about 5 to about 300 mPa-s. In addition, the polyester resins must remain as liquid when allowed to cool to room temperature. Liquid polyester resins of the present invention having the prefered low viscosities enable the use of these resins to obtain solventless liquid enamel compositions for use in coating applications.

Liquid Enamel Compositions

Liquid enamel compositions of the present invention comprise component (1) a polyester of the present invention as described above, component (2) a crosslinking agent and component (3) an organic solvent. The preferred viscosity of the liquid enamel composition is between 50 and 1,000 mPa-s at room temperature (from about 20° C. to about 25° C.).

Component (1): a polyester of the present invention

Component (1) is a polyester in accordance with the present invention as previously described. The preferred amount of the polyester is between about 50 and about 90 wt. %; a more preferred amount for the polyester component is between about 60 and about 80 wt. %.

Component (2): a crosslinking agent

Suitable crosslinking agents for component (2) include, but are not limited to, melamine-formaldehyde type and isocyanate type crosslinking agents. Preferred crosslinking agents include hexamethoxymethylmelamine; tetramethoxymethylbenzoguanamine; tetramethoxymethylurea; mixed butoxy/methoxy substituted melamines; hexamethoxymethyl melamine; toluene diisocyanate; diphenyl methane-4-4'-diisocyanate; hexamethylene diisocyanate; and their oligomeric adducts. A more preferred crosslinking agent is hexamethoxymethylmelamine.

The preferred amount of component (2) is from about 10 to about 50 wt. %. A more preferred amount is from about 15 to about 30 wt. %.

Component (3): an organic solvent

Suitable solvents include, but not limited to o-xylene; m-xylene; p-xylene; cyclohexanone; a ketone such as methyl amyl ketone; 2-butoxyethanol; ethyl-3-ethoxypropionate; toluene; n-butanol; and other volatile inert solvents typically used in industrial thermosetting enamels.

A preferred amount of solvent is less than about 20 wt. % and a more preferred amount is from about 0 to about 10 wt. %.

The percentages above are calculated based on the total percentage of components (1), (2), and (3).

The liquid enamel compositions may further contain a catalyst to facilitate the curing process. Acid catalysts such as p-toluene sulfonic acid are suitable for curing with melamine crosslinking agents; tertiary amines or metal-organic compounds such as dibutyltin dilaurate are suitable for curing with isocyanate crosslinking agents.

Metal driers, well known to those skilled in the art, such as various salts of cobalt, zirconium, and calcium may also be added to the liquid enamel composition to facilitate curing through oxidation of unsaturated fatty acid moieties.

When the crosslinking agent is of the melamine-formaldehyde type, the liquid enamel composition requires baking at elevated temperature, preferably from about 110° to about 175° C., in order to cure the coating. In this case, a one-package system may be used containing components (1), (2) and (3). When the crosslinking agent is of an isocyanate type, crosslinking may be achieved by air drying at room temperature. In this case, a two-package system is required to separate the polyester component (1) from the crosslinking component (2). The solvent component (3) may be together with either component (1) or (2), or distributed between components (1) and (2).

The liquid polyester enamel composition may further contain a pigment such as $TiO_2$ and other known additives such as flow-control agents, wetting or dispersing agents. The liquid enamel compositions of the present invention may be used in a variety of coating formulations and may be applied to various substrates such as metal, wood, or paper.

Suitable methods of application to a substrate include, but are not limited to, hand brushing, hand-roller-coating, conventional spraying, steam spraying, direct roller coating, reverse roller coating, coil coating, knife coating, curtain coating, flow coating, dipping, and tumbling. These methods are known to those skilled in the art and have been described in the treatise: "Technology of Paints, Varnishes and Lacquers", Edited by C. R. Martens, Robert E. Krieger Publishing Company, Huntington, N.Y., 1968, pages 13–14, incorporated herein by reference.

Having generally described this invention, a further understanding can be obtained by reference to certain specific examples which are provided herein for purposes of illustration only and are not intended to be limited unless otherwise specified.

EXAMPLES

Example 1

Preparation of Polyester Resin 1

Into a three-neck, round-bottom flask equipped with a mechanical stirrer, a steam-jacked partial condenser, a Dean-Stark trap, a nitrogen inlet, and a water condenser were charged 139.30 g (1.34 mol) of neopentyl glycol (NPG); 47.60 g (0.35 mol) of pentaerythritol (PE); 108.04 g (0.65 mol) of isophthalic acid (IPA); 12.12 g (0.12 mol) maleic anhydride (MA); and 0.50 g of FASCAT 4100 catalyst, available from Atochem USA, Inc. The mixture was allowed to react at 160° to 200° C. until 25.5 ml of condensate (water) was collected in the Dean-Stark trap. After the mixture was cooled, 470.20 g (1.62 mol) of PAMOLYN 200 tall oil fatty acid (available from Hercules) was added. The reaction was allowed to continue at 180° to 220° C. until an acid number of 3.1 mg KOH/g was obtained. The resulting polyester had the following characteristics: number average molecular weight (Mn): 1294; weight average molecular weight (Mw): 2775; Brookfield viscosity: 120 mPa-s.

Example 2

Preparation of Polyester Resin 2

Into a three-neck, round-bottom flask equipped with a mechanical stirrer, a stream-jacked partial condenser, a Dean-Stark trap, a nitrogen inlet, and a water condenser were charged of 139.30 g (1.34 mol) neopentyl glycol (NPG); 47.60 g (0.35 mol) of pentaerythritol (PE); 111.86 g (0.65 mol) of 1,4-cyclohexanedicarboxylic acid (CHDA); 12.12 g (0.12 mol) of maleic anhydride (MA); and 0.50 g of FASCAT 4100 catalyst. The mixture was allowed to react at 160° to 200° C. until 25.5 ml of condensate (water) was collected in the Dean Stark trap. The mixture was then allowed to cool and 470.20 g (1.62 mol) of PAMOLYN 200 tall oil fatty acid added. The reaction was allowed to continue at 180° to 220° C. until and acid number of 3.3 mg KOH/g was obtained. The resulting polyester had the following characteristics: Mn: 992; Mw: 2272; and Brookfield viscosity: 81 mPa-s.

Example 3

Preparation of Enamel Composition

A pigment grind was prepared by using a DISPERMAT mixer (available from BYK-Chemie) to blend 27.5 g of Resin 1, 110.0 g of TI-PURE R-900 titanium dioxide (available from DuPont) and 0.5 g FC-430 flow-control additive (available from 3M, 20% in isopropanol), until a measurement of Hegman 7+ particle size (Gardner) was obtained. To the grind was then added 82.5 g Resin 1, 47.14 g RESIMENE 745 melamine crosslinker and 3.93 g (40% in isopropanol) of p-toluene sulphonic acid (pTSA) catalyst. The mixture was further stirred to provide a homogenous white paint.

Example 4

Coating Properties

The process described in Example 3 was also used to prepare an enamel composition using Resin 2. The enamels prepared from Resin 1 and Resin 2, respectively were coated on cold-rolled steel test panels (ACT 3×9×032 from Advances Coating Technologies) and baked in an oven at 130° C. for 30 minutes.

Test Procedures

Solvent Resistance

Solvent resistance was determined by the methylethyl ketone (MEK) Double Rub in accordance with ASTM D1308.

Gloss

Gloss was determined by using a BYK-Micro-gloss meter in accordance with ASTM D523.

Impact Resistance

Impact resistance was determined by BYK-Gardner Impact Tester in accordance with ASTM D2794.

Pencil Hardness

Pencil Hardness was determined by using engineer pencils with various hardness in accordance with ASTM D3362.

Humidity

Cleveland Humidity was determined by suing a water condensing cabinet from Q-PANEL CO., at 60° C. in accordance with ASTM D2247. The resulting coating properties are summarized in the following Table 1.

TABLE 1

Coating Properties of Enamel Compositions

|  | Resin 1 | Resin 2 |
|---|---|---|
| Solvent Resistance (MEK double rubs, 200) | no effect | no effect |
| Gloss (60/20) | 91/78 | 88/71 |
| Impact Resistance, kg-cm (Forward/Reverse) | 152/133 (160/140 lb-in) | 133/86 (140/90 lb-in) |
| Pencil Hardness, |  |  |
| (<one day) | 4B | <4B |
| (one week) | (2–3B) | (2–3B) |
| Cleveland Humidity 1000 hr | blisters on edge only | blistering |

Example 5

Comparative Example

Into a three-neck, round bottom flask equipped with a mechanical stirrer, a steam-jacked partial condenser, a Dean-Stark trap, a nitrogen inlet, and a water condenser were charged 175.50 g (1.49 mol) of 1,6-hexanediol; 149.70 g (1.03 mol) of adipic acid; and 0.3 g of FASCAT 4100 catalyst. The mixture was allowed to react at 155° to 180° C. until 36.5 ml of the condensate (water) was obtained in the Dean-Stark trap. The acid number was determined to be 4.3 mg KOH/g. The resulting polyester had the following characteristics: Mn: 1255; and Mw: 2181. The viscosity could not be measured, as the polyester solidified at room temperature.

Unlike the clear, liquid resins prepared in Examples 1 and 2, the resulting resin became a crystalline solid when the resin was allowed to cool. Consequently, it was required to use an organic solvent to dissolve the solid material in order to make a paint formulation. This is in contrast to Resins 1 and 2, which did not require solvent to make an enamel composition useful as a paint.

Example 6

One Stage Process Example

Into a three-neck, round bottom flask equipped with a mechanical stirrer, a steam-jacked partial condenser, a Dean-Stark trap, a nitrogen inlet, and a water condenser were charged 69.95 g (0.67 mol) of NPG; 23.8 g of PE; 54.02 g (0.18 mol) of IPA; 6.06 g (0.06 mol) of MA; 235.10 g (0.81 mol) of PAMOLYN 200 tall oil fatty acid; and 0.25 g of FASCAT 4100 catalyst. The mixture was allowed to react at 180° C. to 220° C. until an acid number of 5.4 mg KOH/g was obtained. The resulting resin had the following properties: Mn: 1549 and Mw:3747.

What is claimed is:

1. A polyester comprising the reaction product of:
   (a) from about 20 to about 45 mol% of a diol;
   (b) from about 4 to about 25 mol% of a polyol;
   (c) from about 5 to about 25 mol% of a diacid;
   (d) up to about 6 mol% of an ethylenically unsaturated anhydride: and
   (e) from about 35 to about 45 mol% of a monofunctional fatty acid;
   wherein all mol percentages are based on the total mols of (a), (b), (c), (d) and (e); and
   wherein said polyester has a viscosity of about 50 to about 1,000 mPa-s at room temperature.

2. The polyester of claim 1, wherein said polyester has a number average molecular weight (Mn) of about 700 to about 1,800.

3. The polyester of claim 1, wherein said diol is present in an amount of from about 25 to about 40 mol%; said polyol is present in an amount of from about 6 to about 20 mol%; said diacid is present in an amount of from about 10 to about 20 mol%; said ethylenically unsaturated anhydride is present in an amount of from about 2 to about 5 mol%; and said monofunctional fatty acid is present in an amount of from about 30 to about 50 mol% wherein all mol percentages are based on the total mols of (a), (b), (c), (d) and (e).

4. The polyester of claim 1, wherein said diol is present in an amount of from about 30 to about 35 mol%; said polyol is present in an amount of from about 8 to about 15 mol%; said diacid is present in an amount of from about 13 to about 18 mol%; said ethylenically unsaturated anhydride is present in an amount of from about 3 to about 4 mol%; and said monofunctional fatty acid is present in an amount of from about 35 to about 45 mol% wherein all mol percentages are based on the total mols of (a), (b), (c), (d) and (e).

5. The polyester of claim 1, wherein said diol is selected from the group consisting of ethylene glycol; propylene glycol; 1,3-propane diol; 2,4-dimethyl-2-ethylhexane-1,3-diol; 2,2-dimethyl-1,3-propanediol; 2-ethyl-2-butyl-1,3-propane diol; 2-ethyl-2-isobutyl-1,3-propane diol; 1,3-butane diol, 1,4-butanediol; 1,5-pentanediol, 1,6-hexanediol; 2,2,4-trimethyl-1,6-hexanediol; thioldiethanol; 1,2-cyclohexane dimethanol; 1,3-cyclohexane dimethanol; 1,4-cyclohexane dimethanol; 2,2,4,4-tetramethyl-1,3-cyclobutane diol; p-xylylenediol; diethylene glycol; triethylene glycol; tetraethylene glycol; pentaethylene glycol; hexaethylene glycol; heptaethylene glycol; octaethylene glycol; monoethylene glycol; decaethylene glycol; 2,2,4-trimethyl-1,3-pentanediol; 2,2,4-trimethyl-1,3-cyclobutanediol; p-xylenediol; hydroxypivalyl hydroxypivalate; 1,10-decanediol and hydrogenated bisphenol A.

6. The polyester of claim 1, wherein said dicarboxylic acid is selected from the group consisting of terephthalic acid; tetrachlorophthalic anhydride; isophthalic acid; phthalic acid; phthalic anhydride; dodecanedioic acid; azelaic acid; 1,3-cyclohexanedicarboxylic acid; succinic acid; glutaric acid; adipic acid; sebacic acid; and 1,4-cyclohexane dicarboxylic acid.

7. The polyester of claim 1, wherein said ethylenically unsaturated anhydride is selected from the group consisting of maleic anhydride, maleic acid, itaconic anhydride, fumaric acid, itaconic acid, tetrahydrophthalic anhydride, crotonic acid, and crotonic anhydride.

8. The polyester of claim 1, wherein said monofunctional fatty acid is selected from the group consisting of tallow acid; linoleic acid; linolenic acid; oleic acid; soya acid; myristic acid; linseed acid; crotonic acid; versatic acid; coconut acid; tall oil fatty acid; rosin acid; neodecanoic acid; isostearic acid; 12-hydroxystearic; and cottonseed acid.

9. The polyester of claim 1, wherein said diol is 2,2-dimethyl-1,3-propanediol; said polyol is pentaerytritol; said dicarboxylic acid is isophthalic acid; and said ethylenically unsaturated anhydride is maleic anhydride.

10. The polyester of claim 1, wherein said diol is 2,2-dimethyl-1,3-propanediol; said polyol is pentaerytritol; said dicarboxylic acid is 1,4-cyclohexanedicarboxylic acid; and said ethylenically unsaturated anhydride is maleic anhydride.

11. A liquid enamel composition, comprising:
(1) from about 50 to about 90 wt. % of a polyester;
(2) from about 10 to about 50 wt. % of a crosslinking agent; and
(3) less than about 20 wt. % of an organic solvent;
wherein all percentages are based on the total weight of (a), (b), and (c), with the total being 100%;
wherein said polyester comprises the reaction products of:
(a) from about 20 to about 45 mol% of a diol;
(b) from about 4 to about 25 mol% of a polyol;
(c) from about 5 to about 25 mol% of a diacid;
(d) from about 0 to about 6 mol% of an ethylenically unsaturated anhydride: and
(e) from about 35 to about 45 mol% of a monofunctional fatty acid;
wherein all mol percentages are based on the total mols of (a), (b), (c), (d) and (e); and
wherein said polyester has a viscosity of about 50 to about 1,000 mPa-s at room temperature.

12. The liquid enamel composition of claim 11, wherein said polyester has a number average molecular weight of about 700 to about 1,800.

13. The liquid enamel composition of claim 11, wherein said polyester is present in an amount of from about 60 to about 80 wt. %.

14. The liquid enamel composition of claim 11, wherein said crosslinking agent is present in an amount of from about 15 to about 30 wt. %.

15. The liquid enamel composition of claim 11, wherein said organic solvent is present in an amount of from 0 to about 10 wt. %.

16. The liquid enamel composition of claim 11, wherein said crosslinking agent is selected from the group consisting of hexamethoxymethylmelamine, tetramethoxymethylbenzoguanamine, tetramethoxymethylurea, mixed butoxy/methoxy substituted melamines; hexamethoxymethyl melamine; toluene diisocyanate, diphenyl methane-4-4'-diisocyanate, hexamethylene diisocyanate, and their oligomeric adducts.

17. The liquid enamel composition of claim 11, wherein said organic solvent is selected from the group consisting of o-xylene; m-xylene; p-xylene; cyclohexanone; methyl amyl ketone; 2-butoxyethanol; ethyl-3-ethoxypropionate; toluene; and n-butanol.

* * * * *